US012299093B1

(12) United States Patent
Bell et al.

(10) Patent No.: US 12,299,093 B1
(45) Date of Patent: May 13, 2025

(54) MACHINE-LEARNING FOR REAL-TIME AND SECURE ANALYSIS OF DIGITAL METRICS

(71) Applicant: Wells Fargo Bank, N.A., San Francisco, CA (US)

(72) Inventors: Thomas E. Bell, San Francisco, CA (US); Peter Bordow, Fountain Hills, AZ (US); Julio Jiron, San Bruno, CA (US); Akhlaq M. Khan, San Francisco, CA (US); Volkmar Scharf-Katz, San Francisco, CA (US); Jeff J. Stapleton, Arlington, TX (US); Richard Orlando Toohey, San Francisco, CA (US); Ramesh Yarlagadda, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 230 days.

(21) Appl. No.: 17/893,947

(22) Filed: Aug. 23, 2022

(51) Int. Cl.
　　G06F 21/31　　(2013.01)
　　G06F 21/46　　(2013.01)
(52) U.S. Cl.
　　CPC ............ G06F 21/316 (2013.01); G06F 21/46 (2013.01)
(58) Field of Classification Search
　　CPC .............................. G06F 21/316; G06F 21/46
　　(Continued)

(56) References Cited

U.S. PATENT DOCUMENTS 7,133,846 B1　11/2006　Ginter et al.
7,673,797 B2　3/2010　Edwards
(Continued)

FOREIGN PATENT DOCUMENTS

CA　　　　2478548 C　　3/2014
DE　10 2021 108 925 A1　10/2022
(Continued)

OTHER PUBLICATIONS

Jain, et al., A Blockchain-Based distributed network for Secure Credit Scoring, 2019 5th International Conference on Signal Processing, Computing and Control (ISPCC), 306-12, Oct. 2019; ISBN-13: 978-1-7281-3988-3.
(Continued)

*Primary Examiner* — Dant B Shaifer Harriman
(74) *Attorney, Agent, or Firm* — Foley & Lardner LLP

(57) ABSTRACT

Disclosed are example methods, systems, and devices that allow for executing machine-learning models for real-time and secure analysis of digital metrics. The techniques include generating metrics for identity elements stored in digital profiles of users. A subset of profiles can be identified that have metrics that fall below a predetermined thresholds, with which a training dataset can be generated. Machine-learning models can be executed over the training dataset to train an artificial intelligence agent that receives digital profiles as input and outputs translational elements corresponding to identity elements in the digital profiles. After training, additional profiles can be input to the machine-learning models of the artificial intelligence agent to identify a second subset of digital profiles with corresponding metrics. Electronic messages corresponding to the second subset can be generated and transmitted to one or more computing devices identified in the second subset of digital profiles.

20 Claims, 6 Drawing Sheets

(58) Field of Classification Search
USPC .......................................................... 726/7
See application file for complete search history.

(56) References Cited

U.S. PATENT DOCUMENTS

| | | |
|---|---|---|
| 8,234,387 B2 | 7/2012 | Bradley et al. |
| 8,446,275 B2 | 5/2013 | Utter, II |
| 8,731,977 B1 | 5/2014 | Hardin et al. |
| 8,756,153 B1 | 6/2014 | Rolf |
| 8,831,972 B2 | 9/2014 | Angell et al. |
| 8,965,803 B2 | 2/2015 | Jung et al. |
| 9,087,058 B2 | 7/2015 | Neven et al. |
| 9,094,388 B2 | 7/2015 | Tkachev |
| 9,177,257 B2 | 11/2015 | Kozloski et al. |
| 9,443,298 B2 | 9/2016 | Ross et al. |
| 9,519,783 B2 | 12/2016 | Pruthi et al. |
| 9,558,397 B2 | 1/2017 | Liu et al. |
| 9,734,290 B2 | 8/2017 | Srinivas et al. |
| 9,864,992 B1 | 1/2018 | Robinson et al. |
| 10,024,684 B2 | 7/2018 | Wang |
| 10,044,700 B2 | 8/2018 | Gresham et al. |
| 10,075,445 B2 | 9/2018 | Chen et al. |
| 10,102,491 B2 | 10/2018 | Connolly et al. |
| 10,110,608 B2 | 10/2018 | Dureau |
| 10,127,378 B2 | 11/2018 | Toth |
| 10,142,362 B2 | 11/2018 | Weith et al. |
| 10,181,032 B1 | 1/2019 | Sift |
| 10,210,527 B2 | 2/2019 | Radocchia |
| 10,218,510 B2 | 2/2019 | Kinney et al. |
| 10,313,336 B2 | 6/2019 | Giobbi |
| 10,362,027 B2 | 7/2019 | Eramian et al. |
| 10,387,695 B2 | 8/2019 | Engels et al. |
| 10,454,913 B2 | 10/2019 | Maninder et al. |
| 10,505,965 B2 | 12/2019 | Moyle et al. |
| 10,552,596 B2 | 2/2020 | Wang et al. |
| 10,572,778 B1* | 2/2020 | Robinson ............ G06F 18/2431 |
| 10,614,302 B2 | 4/2020 | Withrow |
| 10,664,581 B2 | 5/2020 | Hou et al. |
| 10,740,767 B2 | 8/2020 | Withrow |
| 10,757,097 B2 | 8/2020 | Yocam et al. |
| 10,778,676 B1 | 9/2020 | Griffin et al. |
| 10,834,084 B2 | 11/2020 | Ouellette et al. |
| 10,855,679 B2 | 12/2020 | Rajakumar |
| 10,938,828 B1* | 3/2021 | Badawy ............... G06F 21/6218 |
| 10,943,003 B2 | 3/2021 | Bingham et al. |
| 10,963,670 B2 | 3/2021 | Ross et al. |
| 10,977,353 B2 | 4/2021 | Bender et al. |
| 11,044,267 B2 | 6/2021 | Jakobsson et al. |
| 11,048,794 B1 | 6/2021 | Bordow |
| 11,048,894 B2 | 6/2021 | Feldman |
| 11,055,390 B1 | 7/2021 | Kragh |
| 11,057,366 B2 | 7/2021 | Avetisov et al. |
| 11,068,909 B1 | 7/2021 | Land et al. |
| 11,075,904 B2 | 7/2021 | Jha et al. |
| 11,089,014 B2 | 8/2021 | Buscemi |
| 11,093,789 B2 | 8/2021 | Wang et al. |
| 11,100,503 B2 | 8/2021 | Iyer et al. |
| 11,127,092 B2 | 9/2021 | Kurian |
| 11,128,467 B2 | 9/2021 | Chapman et al. |
| 11,151,550 B2 | 10/2021 | Prabhu et al. |
| 11,157,907 B1 | 10/2021 | Kumar |
| 11,163,931 B2 | 11/2021 | Ricci |
| 11,200,306 B1 | 12/2021 | Singh |
| 11,205,011 B2 | 12/2021 | Jakobsson et al. |
| 11,223,646 B2 | 1/2022 | Cunningham et al. |
| 11,290,448 B1 | 3/2022 | Bordow |
| 11,327,992 B1 | 5/2022 | Batsakis et al. |
| 11,451,532 B2* | 9/2022 | Arif Khan ............... G06N 20/10 |
| 11,461,298 B1* | 10/2022 | Shemmer ............... G06F 16/215 |
| 11,509,477 B1 | 11/2022 | Poder et al. |
| 11,514,155 B1 | 11/2022 | Bordow |
| 11,522,867 B2 | 12/2022 | Han et al. |
| 11,669,611 B1 | 6/2023 | Bordow |
| 12,034,719 B2* | 7/2024 | Budman ................. G06F 3/011 |
| 2003/0086341 A1 | 5/2003 | Wells et al. |
| 2006/0129478 A1 | 6/2006 | Rees |
| 2007/0078908 A1 | 4/2007 | Rohatgi et al. |
| 2008/0022370 A1* | 1/2008 | Beedubail ............ H04L 63/101 726/4 |
| 2008/0120302 A1* | 5/2008 | Thompson .......... G06F 21/6209 707/999.009 |
| 2009/0089107 A1 | 4/2009 | Angell et al. |
| 2009/0089205 A1 | 4/2009 | Bayne |
| 2012/0237908 A1 | 9/2012 | Fitzgerald et al. |
| 2014/0200885 A1 | 7/2014 | Diggins |
| 2015/0112732 A1 | 4/2015 | Trakru et al. |
| 2015/0220999 A1 | 8/2015 | Thornton et al. |
| 2015/0317728 A1 | 11/2015 | Nguyen |
| 2016/0050557 A1 | 2/2016 | Park et al. |
| 2016/0162882 A1 | 6/2016 | McClung, III |
| 2016/0224773 A1 | 8/2016 | Ramaci |
| 2016/0335629 A1 | 11/2016 | Scott |
| 2017/0012992 A1 | 1/2017 | Doctor et al. |
| 2017/0063831 A1 | 3/2017 | Arnold et al. |
| 2017/0063946 A1* | 3/2017 | Quan ....................... H04L 67/55 |
| 2017/0111351 A1 | 4/2017 | Grajek et al. |
| 2017/0230351 A1 | 8/2017 | Hallenborg |
| 2017/0236037 A1 | 8/2017 | Rhoads et al. |
| 2018/0068103 A1 | 3/2018 | Pitkä'nen et al. |
| 2018/0205546 A1 | 7/2018 | Haque et al. |
| 2019/0095916 A1 | 3/2019 | Jackson |
| 2019/0098500 A1 | 3/2019 | Chen et al. |
| 2019/0149539 A1 | 5/2019 | Scruby |
| 2019/0163889 A1 | 5/2019 | Bouse |
| 2019/0205939 A1 | 7/2019 | Lal et al. |
| 2019/0296913 A1 | 9/2019 | Verma et al. |
| 2019/0334723 A1 | 10/2019 | Anton et al. |
| 2019/0342276 A1* | 11/2019 | Sherif ..................... G06F 21/45 |
| 2020/0036709 A1 | 1/2020 | Mars et al. |
| 2020/0211031 A1 | 7/2020 | Patil |
| 2020/0236113 A1 | 7/2020 | Monica et al. |
| 2020/0266985 A1 | 8/2020 | Covaci et al. |
| 2020/0311678 A1 | 10/2020 | Fletcher et al. |
| 2020/0320619 A1* | 10/2020 | Motaharian ........ G06Q 30/0185 |
| 2020/0374311 A1 | 11/2020 | Madhu et al. |
| 2020/0380598 A1 | 12/2020 | Spector et al. |
| 2021/0027061 A1 | 1/2021 | Xu et al. |
| 2021/0029100 A1 | 1/2021 | Bendersky et al. |
| 2021/0089637 A1 | 3/2021 | Cummins et al. |
| 2021/0104008 A1 | 4/2021 | Ross et al. |
| 2021/0110004 A1 | 4/2021 | Ross et al. |
| 2021/0134434 A1 | 5/2021 | Riley et al. |
| 2021/0202067 A1 | 7/2021 | Williams et al. |
| 2021/0231706 A1* | 7/2021 | Pak ....................... G01R 1/07314 |
| 2021/0234673 A1 | 7/2021 | Kurian et al. |
| 2021/0234693 A1 | 7/2021 | Kurian et al. |
| 2021/0240837 A1 | 8/2021 | Tseng et al. |
| 2021/0258155 A1 | 8/2021 | Andon et al. |
| 2021/0279475 A1 | 9/2021 | Tusch et al. |
| 2021/0297259 A1 | 9/2021 | Rahn et al. |
| 2021/0325427 A1 | 10/2021 | Jain et al. |
| 2021/0326467 A1 | 10/2021 | Levy et al. |
| 2021/0366014 A1 | 11/2021 | Wang et al. |
| 2021/0366586 A1 | 11/2021 | Ryan et al. |
| 2021/0399895 A1 | 12/2021 | Abadir et al. |
| 2022/0004616 A1 | 1/2022 | Eisen et al. |
| 2022/0086141 A1 | 3/2022 | Mossler et al. |
| 2022/0292396 A1* | 9/2022 | Biryukov ............... H04L 67/10 |
| 2022/0345451 A1 | 10/2022 | Hitchcock et al. |
| 2023/0097761 A1 | 3/2023 | Martin De La Bastide et al. |
| 2023/0334476 A1 | 10/2023 | Rule et al. |
| 2023/0403144 A1 | 12/2023 | Rhodin |
| 2024/0064135 A1 | 2/2024 | Sherlock et al. |
| 2024/0095779 A1* | 3/2024 | Maity ..................... G06N 5/022 |
| 2024/0185596 A1 | 6/2024 | Neuschafer et al. |
| 2024/0185660 A1 | 6/2024 | Masood |
| 2024/0214194 A1 | 6/2024 | Kapur et al. |
| 2024/0256878 A1* | 8/2024 | Palleti ..................... G06N 3/08 |
| 2024/0340314 A1 | 10/2024 | Radon et al. |

(56) References Cited

U.S. PATENT DOCUMENTS

2024/0346085 A1* 10/2024 Soon-Shiong ........... G06N 5/04
2024/0395374 A1* 11/2024 Agassi .................. G16H 50/70

FOREIGN PATENT DOCUMENTS

| WO | WO-2011/016710 A1 | 2/2011 |
| WO | WO-2016/083987 A1 | 6/2016 |
| WO | WO-2019/013818 A1 | 1/2019 |
| WO | WO-2019/123291 A1 | 6/2019 |

OTHER PUBLICATIONS

Yan Zhang et al., Real-time Machine Learning Prediction of an Agent-Based Model for Urban Decision-making, URL: https://ifaamas.org/Proceedings/aamas2018/pdfs/p2171.pdf (Jul. 10-15, 2018).

* cited by examiner

MACHINE-LEARNING FOR REAL-TIME AND SECURE ANALYSIS OF DIGITAL METRICS

TECHNICAL FIELD

The present disclosure relates to machine-learning for real-time and secure analysis of digital metrics.

BACKGROUND

Client applications can access resources from servers. In many cases, applications utilize authenticating information or profiles to access computing systems. However, the use of such profiles can be inherently insecure and may result in network security breaches.

SUMMARY

One aspect of the present disclosure relates to a method for executing machine-learning models for network security. The method may be performed, for example, by a computing system comprising one or more processors coupled to a non-transitory memory. The method may include generating, for each digital identity profile in a first set of digital identity profiles a first metric corresponding to a first time period, and a second metric corresponding to a second time period following the first time period. The method may include identifying a first subset of the first set of digital identity profiles for which the first metric falls below a threshold. The second metric may be at least as great as the threshold. The method may include generating, for digital identity profiles in the first subset of digital identity profiles, a training dataset based on the first set of digital identity elements and the second set of digital identity elements. The method may include applying one or more machine learning models to the training dataset to train an artificial intelligence agent that is configured to receive, as input, digital identity profiles and provide, as output, transitional elements corresponding to digital identity elements in the digital identity profiles received as input. The method may include generating a third metric for each digital identity profile in a second set of digital identity profiles. The method may include identifying a second subset of the second set of digital identity profiles for which the third metric falls below the threshold. The method may include inputting the second subset of second set of digital identity profiles to the AI agent to generate, for each digital identity profile in the second set of digital identity profiles, a set of transitional elements. The method may include transmitting, to one or more computing devices identified in the second subset of digital identity profiles, one or more electronic messages corresponding to the set of transitional elements.

In some implementations, applying the one or more machine learning models may include applying a pattern recognition model or a classification model to recognize normal or abnormal patterns of behavior. In some implementations, applying the one or more machine learning models may include applying a regression model to identify causal factors for one or more identity elements or corresponding metadata in digital identity profiles. In some implementations, applying the one or more machine learning models may include applying a decisioning model to identify actions suited to achieving particular goals based on available options.

In some implementations, the method can include further including adding the set of transitional elements to corresponding digital identity profiles in the second subset of digital identity profiles. In some implementations, the computing system may be a first computing system. In some implementations, the method may further include retrieving, from a second computing system with the first set of digital identity profiles, the first set of digital identity elements corresponding to the first time period. In some implementations, the first set of metadata corresponding to the first set of digital identity elements, the second set of digital identity elements corresponding to the second time period, and the second set of metadata corresponding to the second set of digital identity elements.

In some implementations, the retrieving may include transmitting a first application programming interface call to the second computing system. In some implementations, the computing system may be a first computing system, the method further including retrieving the second set of digital identity profiles from a second computing system. In some implementations, the retrieving may include transmitting an application programming interface call to the second computing system. In some implementations, the first set of digital identity profiles and the second set of digital identity profiles may be maintained by the computing system. In some implementations, a metric meeting or exceeding the threshold may indicate electronic activities that correspond to a predetermined outcome.

In some implementations, the one or more electronic messages may include one or more selectable electronic links for activities corresponding to a predetermined outcome. In some implementations, the method can include further including determining that one or more selectable links in the one or more electronic messages have been activated. In some implementations, the method can include further including adding an indication that one or more selectable links have been activated. In some implementations, the method can include further including transmitting a second set of one or more electronic messages based on activation of one or more selectable links.

Another aspect of the present disclosure relates to a system configured for executing machine-learning models for network security. The system may include a computing system comprising one or more hardware processors coupled to a non-transitory memory. The system can generate, for each digital identity profile in a first set of digital identity profiles a first metric corresponding to a first time period, and a second metric corresponding to a second time period following the first time period. The system can identify a first subset of the first set of digital identity profiles for which the first metric falls below a threshold. The second metric may be at least as great as the threshold. The system can generate, for digital identity profiles in the first subset of digital identity profiles, a training dataset based on the first set of digital identity elements and the second set of digital identity elements. The system can apply one or more machine learning models to the training dataset to train an artificial intelligence agent that is configured to receive, as input, digital identity profiles and provide, as output, transitional elements corresponding to digital identity elements in the digital identity profiles received as input. The system can generate a third metric for each digital identity profile in a second set of digital identity profiles. The system can identify a second subset of the second set of digital identity profiles for which the third metric falls below the threshold. The system can input the second subset of second set of digital identity profiles to the AI agent to generate, for each digital identity profile in the second set of digital identity profiles, a set of transitional elements. The system can transmit, to one or more computing devices identified in the second subset of digital identity profiles, one or more electronic messages corresponding to the set of transitional elements.

In some implementations, applying the one or more machine learning models may include applying a pattern recognition model or a classification model to recognize normal or abnormal patterns of behavior. In some implementations, applying the one or more machine learning models may include applying a regression model to identify causal factors for one or more identity elements or corresponding metadata in digital identity profiles. In some implementations, applying the one or more machine learning models may include applying a decisioning model to identify actions suited to achieving particular goals based on available options.

In some implementations, the system can add the set of transitional elements to corresponding digital identity profiles in the second subset of digital identity profiles. In some implementations, the computing system may be a first computing system. In some implementations, the method may further include retrieving, from a second computing system with the first set of digital identity profiles, the first set of digital identity elements corresponding to the first time period. In some implementations, the first set of metadata corresponding to the first set of digital identity elements, the second set of digital identity elements corresponding to the second time period, and the second set of metadata corresponding to the second set of digital identity elements.

In some implementations, the retrieving may include transmitting a first application programming interface call to the second computing system. In some implementations, the computing system may be a first computing system, the method further including retrieving the second set of digital identity profiles from a second computing system. In some implementations, the retrieving may include transmitting an application programming interface call to the second computing system. In some implementations, the first set of digital identity profiles and the second set of digital identity profiles may be maintained by the computing system.

In some implementations, a metric meeting or exceeding the threshold may indicate electronic activities that correspond to a predetermined outcome. In some implementations, the one or more electronic messages may include one or more selectable electronic links for activities corresponding to a predetermined outcome. In some implementations, the system can determine that one or more selectable links in the one or more electronic messages have been activated. In some implementations, the system can add an indication that one or more selectable links have been activated. In some implementations, the system can transmit a second set of one or more electronic messages based on activation of one or more selectable links.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations, and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Below are detailed descriptions of various concepts related to, and implementations of, techniques, approaches, methods, apparatuses, and systems for executing machine-learning models for real-time and secure analysis of digital metrics. The various concepts introduced above and discussed in detail below may be implemented in any of numerous ways, as the described concepts are not limited to any particular manner of implementation. Examples of specific implementations and applications are provided primarily for illustrative purposes.

Various embodiments described herein relate to executing machine-learning models for real-time and secure analysis of digital metrics. Certain digital profiles, such as digital identity profiles, may include information that can result in reduced network performance or reduced network security. Given that access to digital assets, which may include secured electronic information or secured physical locations, can be controlled using authentication credentials stored in digital profiles, it is paramount to ensure that digital profiles are secure in networked environments.

To address these and other issues, the present techniques can execute machine-learning models for real-time and secure analysis of digital metrics, particularly those present in digital profiles. The techniques described herein can be utilized to generate training datasets to train an artificial intelligence agent, which can receive digital identity profiles as input, and provide transitional elements as output. The transitional elements can be elements included in the digital profile that may, for example, expose the digital profile to higher risk of a data breach. The trained artificial intelligence agent can be executed to detect similar transitional elements across a large cohort of digital profiles. Electronic messages can be generated to provide indications that certain elements of digital profiles may expose the network, or the digital profiles that are used to access computing devices of the network, to potential security breaches or cyberattacks. Therefore, the present techniques provide improvements to network security processing systems by enabling real-time monitoring and amelioration of potential security threats in digital profiles.

Figure 1:
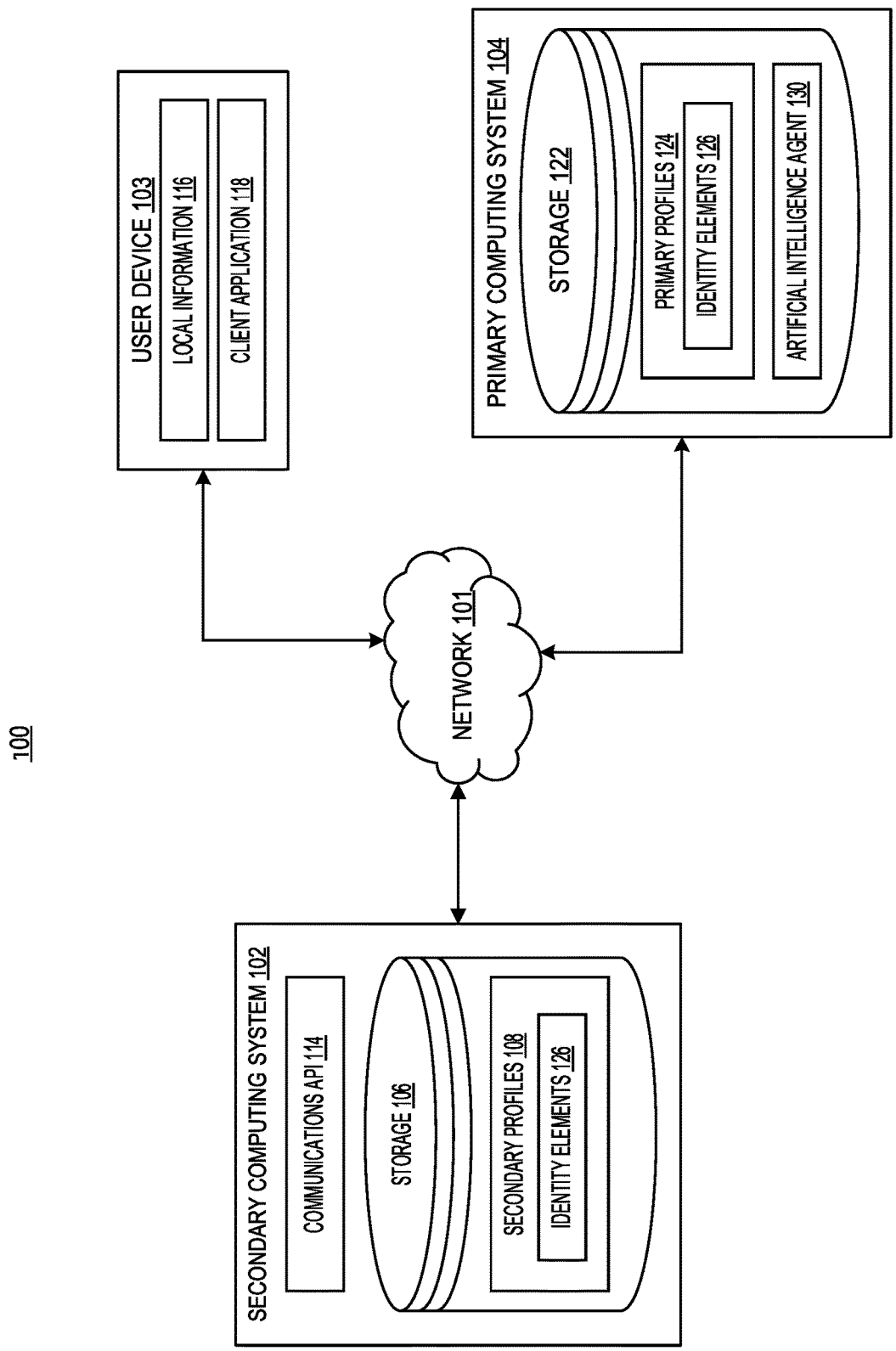
FIG. 1 is a block diagram of an example system for executing machine-learning models for real-time and secure analysis of digital metrics, in accordance with one or more example implementations.

Referring to FIG. 1, illustrated is a block diagram of an example system 100 for secure digital authorization via generated datasets, in accordance with one or more example implementations. The system 100 may include a user device 103, a secondary computing system 102, and a primary computing system 104. Each of the secondary computing system 102, the primary computing system 104, and the user device 103 can be in communication with one another via the network 101. The network 101 can facilitate communications among the user device 103, the secondary computing system 102, and the primary computing system 104 over, for example, the internet or another network via any of a variety of network protocols such as Ethernet, Bluetooth, Cellular, or Wi-Fi.

Each component of the system 100 may include one or more processors, memories, network interfaces, and user interfaces. The memory may store programming logic that, when executed by the processor, controls the operation of the corresponding computing device. The memory may also store data in databases. The network interfaces allow the computing devices to communicate wirelessly or otherwise. The various components of devices in system 100 may be implemented via hardware (e.g., circuitry), software (e.g., executable code), or any combination thereof.

The secondary computing system 102 can include at least one processor and a memory (e.g., a processing circuit). The memory can store processor-executable instructions that, when executed by a processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The secondary computing system 102 can include one or more computing devices or servers that can perform various functions as described herein. The secondary computing system 102 can include any or all of the components and perform any or all of the functions of the computer system 600 described herein in conjunction with FIG. 6.

The secondary computing systems 102 may be computing systems of information technology service providers, social media platforms, webservers, chatrooms, forums, or any other computing system that may maintain information about or relating to one or more users, such as a third-party computing system. Secondary computing systems 102 of non-financial institutions may be associated with marketing platforms, social media platforms, network environment platforms, network configuration platforms, or user databases, among others. The secondary computing systems 102 may each include one or more network interfaces that facilitate communication with other computing systems of the system 100 via the network 101. In some implementations, one or more of the secondary computing systems 102 may be owned or controlled by a single entity.

The user device 103 can include at least one processor and a memory (e.g., a processing circuit). The memory can store processor-executable instructions that, when executed by a processor, cause the processor to perform one or more of the operations described herein. The processor may include a microprocessor, an ASIC, an FPGA, etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions may include code from any suitable computer programming language. The user device 103 can include one or more computing devices (e.g., desktop computers, laptop computers, servers, smartphones, tablets, etc.) that can perform various functions as described herein. The user device 103 can include any or all of the components and perform any or all of the functions of the computer system 600 described herein in conjunction with FIG. 6.

The user device 103 may include mobile or non-mobile devices, such as smartphones, tablet computing devices, wearable computing devices (e.g., a smartwatch, smart optical wear, etc.), personal computing devices (e.g., laptops or desktops), voice-activated digital assistance devices (e.g., smart speakers having chat bot capabilities), portable media devices, vehicle information systems, or the like. The user device 103 may access one or more software applications running locally or remotely. The user device 103 may operate as a "thin client" device, which presents user interfaces (such as the user interface described in connection with FIG. 5) for applications that execute remotely (e.g., at the secondary computing system 102, the primary computing system 104, etc.). The user device 103 can be associated with a respective device identifier. The identifier may be a universally unique identifier (UUID), a globally unique identifier (GUID), a media access control (MAC) address, an internet protocol (IP) address, a device serial number, a serial number of a component of the user device 103, a predetermined or randomly generated value associated with the user device 103, or any type of identifier that identifies the user device 103 or the components thereof.

Input from the user received via the user device 103 may be communicated to other computing devices (e.g., the primary computing system 104, the secondary computing system 102, etc.). The other computing systems (which can execute remote applications) may provide additional information to the user device 103 or execute further operations in response to the user input. In some examples, a user may access any of the computing devices of the system 100 through various user devices 103 at the same time or at different times. The user may access one or more computing systems of the system 100 via a digital assistance device while also accessing one or more computing systems of the system 100 using a wearable computing device (e.g., a smart watch). In other examples, the user may access one or more computing systems of the system 100 via a digital assistance device and later access the system 100 via a vehicle information system, a desktop computing system, a smartphone or tablet computing system, or a laptop computing system.

The user device 103 can execute a client application 118, which may provide one or more user interfaces and receive user input via one or more input/output (I/O) devices. The client application 118 may be provided by or be associated with the primary computing system 104 or the secondary computing system 102. In some implementations, the client application 118 may be a web-based application that is retrieved and displayed in a web-browser executing at the primary computing system 104 or the secondary computing system 102. In some implementations, the client application 118 can execute locally at the user device 103 and may communicate information with the secondary computing systems 102 or the primary computing system 104 via the network 101. The client application 118 can access one or more device identifiers using an application programming interface (API) of an operating system of the user device 103. In some implementations, the client application 118 can access a predetermined region of memory where the user device 103 stores one or more device identifiers.

The client application 118 may present one or more user interfaces, for example, in response to user input or interactions with displayed interactive user interface elements. The user interfaces may include user interfaces that capture user information in various fields or interactive user interface elements, which may be provided to the primary computing system 104 or the secondary computing system 102 for storage as part of the identity elements 126. Such user interface elements may include fields that capture or present authentication credentials to access secure applications or resources hosted by the primary computing system 104 or the secondary computing system 102. For example, the user interfaces may include text or other instructions that display a prompt on the display of the user device 103 to provide an answer to one or more security questions, enter a username or password, or provide email information. The fields may also provide authorization information for other, third-party computing systems, such as the secondary computing system 102, which enables the primary computing system 104 to access one or more profiles for the user (e.g., the secondary profiles 108 and the identity elements 126 stored therein) maintained by the secondary computing system 104. The application interfaces 120 can include any type of interactive user interface element, including those that enable a user to provide information that can be stored in the primary profiles 124, send requests, or to navigate between user interfaces of the client application 118.

The user device 103 can store local information 116 in the memory of the user device 103. The local information 116 may include stored preferences (e.g., personal user settings, saved login information, stored authentication credentials, etc.) or other information relating to the use of the client application 118. The local information 116 can be stored in the memory of the user device 103, and can be accessed and modified by the user by accessing corresponding user interfaces of the client application 118. In some implementations, the local information 116 can be transmitted to the primary computing system 104 or the secondary computing system 102 for storage in the primary profile 124 or the secondary profile 108 of the user, respectively. The user, when accessing a client application 118 on a different device, can access the primary computing system 104 using an identifier of the primary profile 124 (e.g., login to the primary computing system 104) or the secondary computing system 102 using an identifier of a secondary profile 108 (e.g., login to the secondary computing system 102), and synchronize (e.g., download and store) the local information 116 on the different device.

The primary computing system 104 can include at least one processor and a memory (e.g., a processing circuit). The memory can store processor-executable instructions that, when executed by processor, cause the processor to perform one or more of the operations described herein. The processor may include a microprocessor, an ASIC, an FPGA, etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions may include code from any suitable computer programming language. The primary computing system 104 can include one or more computing devices or servers that can perform various functions as described herein. The primary computing system 104 can include any or all of the components and perform any or all of the functions of the computer system 600 described herein in conjunction with FIG. 6.

The primary computing system 104 can be a computing system of an entity that maintains digital identity profiles (e.g., the primary profiles 124) for a number of different users. The primary computing system 104 can provide information to the client application 118 executing on a respective user devices 103 of a corresponding user, such as user interfaces, instructions to carry out one or more functionalities described herein, or other information relating to one or more of primary profiles 124. For example, the primary computing system 104 can receive various datasets from the user devices 103, and utilize information in the datasets to generate or update corresponding primary profiles 124 with additional identity elements 126. A respective user can utilize the client application 118 of a respective user device 103 to communicate with the primary computing system 104, for example, to create, modify, delete, or authorize information in connection with a primary profile 124 associated with the user, including any of the functionality described herein (e.g., any operations described in connection with FIG. 3 or 4, etc.). The primary computing system 104 can be backend computer system that interacts with the user devices 103 and supports various services offered by the primary computing system 104, such as information technology (IT) services or network management services. The network management services may utilize the information in one or more of the primary profiles 124 to manage information communicated via the network 101.

The primary computing system 104 can include a storage 122, which may be any type of computer-accessible memory or database that can maintain, manage, or store primary profiles 124, for example, in one or more data structures. Each of the primary profiles 124 may correspond to a respective user, and may be identified by a corresponding user identifier (e.g., a username, an email address, a passcode, an encryption key, etc.). The primary profiles 124 can include one or more identity elements 126, which can include information about the user, including personally identifying data (e.g., name and social security number), psychographics data (e.g., personality, values, opinions, attitudes, interests, and lifestyles), transactional data (e.g., preferred products, purchase history, transaction history), demographic data (e.g., address, age, education), financial data (e.g., income, assets, credit score), or other user or account data that is maintained or otherwise accessible to the primary computing system 104. The primary computing system 104 can receive datasets to generate the identity elements 126 for a user from a respective user device 103 of the user, for example, in a request with a corresponding security token. The primary profiles 124 (sometimes referred to as an "identity profile" or an "identity databank") or the identity elements 126 thereof can be accessed via a client application 118, for example, by way of user input at a user device 103 corresponding to a respective user of the primary profile 124. The primary profile 124 can identify one or more user devices 103 of the user to which the primary profile 124 corresponds (e.g., and additional computing devices may be registered to the primary profile 124 by way of request including two-factor authentication, for example).

Figure 2:
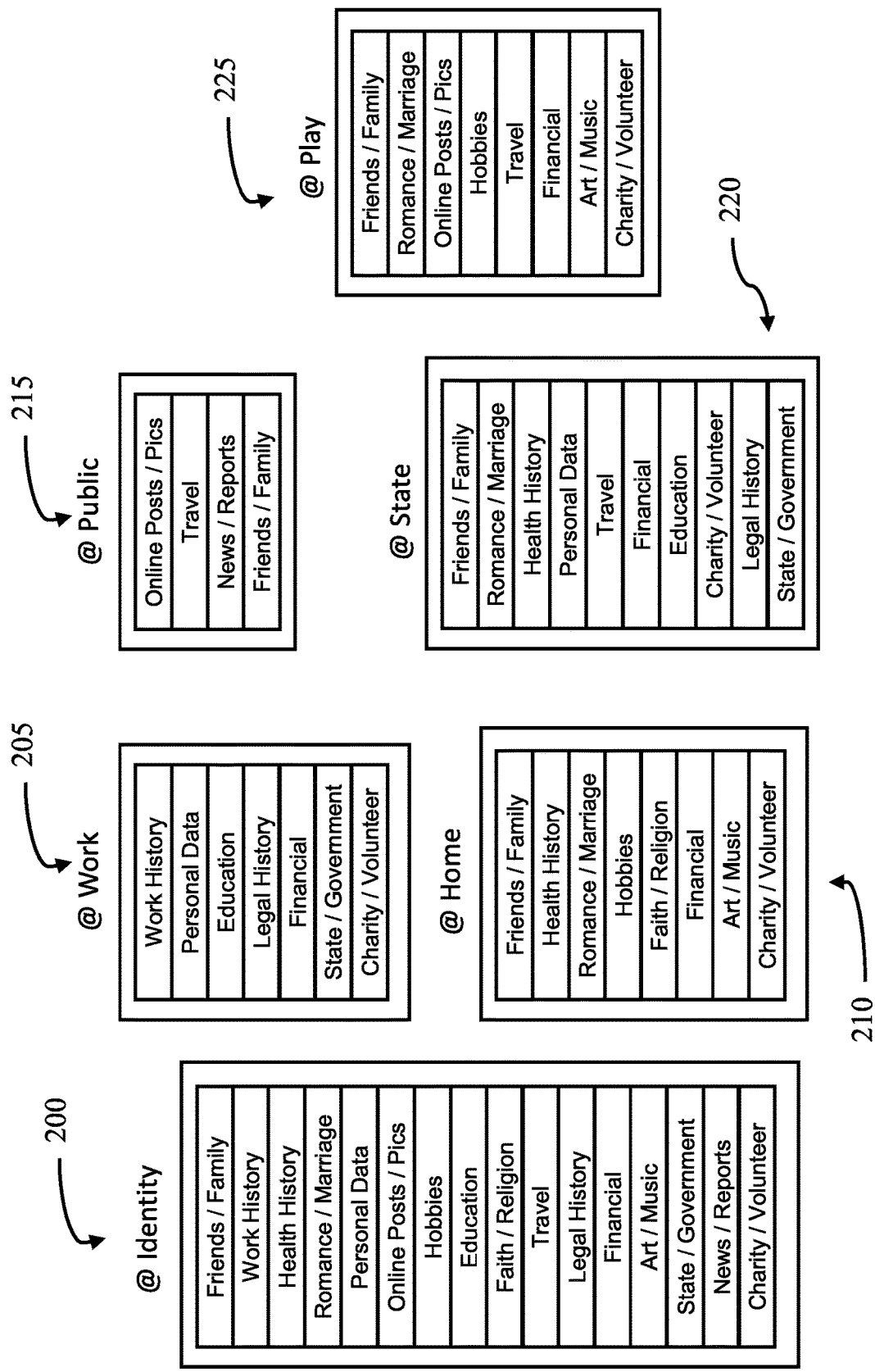
FIG. 2 illustrates a representation of an example set of contexts in which identity elements may be generated or used, or are otherwise relevant, in accordance with one or more example implementations.

Each of the primary profiles 124 can include various categories of the identity elements 126. A representation of various categories of the identity elements 126 that may be stored in a primary profile 124 is shown in FIG. 2. Referring to FIG. 2, illustrated is a representation of an example set of identity elements 126 that may be generated or stored in a primary profile 124. As shown, subsets of identity databank 200 ("@ identity") may include, for example, an "@ work" subset 205 with identity elements 126 related to, for example, "work history" and "education"; an "@ home" subset 210 with identity elements 126 related to, for example, "friends/family" and "romance/marriage"; an "@ public" subset 215 with identity elements 126 related to, for example, "online posts/pics" and "news/reports"; an "@ state" subset 220 with identity elements 126 related to, for example, "legal history" and "state/government"; and an "@ play" subset 225 with identity elements 126 related to, for example, "hobbies" and "travel." These different categories provide context for the arrays of identity elements 126 in the primary profile 126 of a user.

Additional categories, and corresponding identity elements 126, may also be stored in a primary profile 124 of a user. Non-exhaustive examples include a "geolocation" category, which may include identity elements 126 related to locations of a user or one or more user devices 103 of the user at various points of time (e.g., stored in association with timestamps, etc.). A category for "personal data" may include, for example, a name and birthdate of the user. A category for "health history" may include, for example, information that might be found in health records associated with the user, including any electronic medical records as well as electronic prescriptions or data associated therewith. A "romance/marriage" category may include, for example, information related to significant others and spouses of the user. A "work history" category may include, for example, information related to places and dates of employment, titles held, and relevant work experience of the user.

A "charity/volunteer" category may include information related to, for example, charitable contributions or volunteering activities performed or contributed by the user. An "online posts/pics" category may include, for example, textual posts and pictures/videos/other media submitted to social networking accounts via one or more user devices 103 of the user. A "hobbies" category may include, for example, leisure or other non-employment related activities of interest to the user. An "education" category may include, for example, identity elements 126 related to schools attended and degrees earned by the user. A "faith/religion" category may include, for example, identity elements 126 related to churches attended or religious activities of the user. A "travel" category may include, for example, identity elements 126 related to places visited by the user and corresponding timestamps or dates. A "transactions" category may include, for example, identity elements 126 related to purchases made by the user. A "legal history" category may include, for example, identity elements 126 related to legal proceedings involving the user.

A "financial" category may include, for example, identity elements 126 related to financial accounts of the user. An "art/music" category may include, for example, identity elements 126 related to attendance at concerts and types of art and music purchased or otherwise enjoyed by the user. A "state/government" category may include, for example, identity elements 126 related to licenses held by the user. A "news/reports" category may include, for example, information in broadcasts, publications, or reports that mention the user. A "family/friends" may include, for example, identity elements 126 related to children, siblings, and persons with whom the user spends time or otherwise associates. These and other categories or identity elements 126 of a user can be stored in a corresponding primary profile 124 of the user in the storage 122 of the primary computing system 104. The primary computing system 104 can receive one or more datasets (e.g., including information relating to the user) from a user device 103 of a user, and can generate one or more identity elements 126 including the information relating to the user in the primary profile 124 of the user.

Each identity element 126 can include or can be associated with metadata. The metadata can be associated with a respective identity element 126 in the storage 122 to allow for validation, geolocation, ageing, or other operations. The metadata can include timestamps of when the respective identity element 126 was incorporated in the primary profile 124. As such, various identity elements 126 may correspond to a single category or aspect of the user, but may be distinguished from one another by metadata (e.g., timestamps, locations, etc.). As such, the identity elements 126 may be made immutable by various metadata. For example, although a user's hair color may change over time, the user's hair color at a specific time and place is not expected to change, and therefore can be stored with corresponding metadata to identify the user's hair at a particular place and time. The identity elements 126 may also include information corresponding to other users with which the user is associated. For example, if the user has a corresponding linkage definition with another primary profile 124 of another user, the user's primary profile 124 may include identity element(s) 126 with biometric data of the other user, and vice versa.

The primary profiles 124 can be stored in association with one or more identifiers of one or more user devices 103. Identifiers of a primary profile 124 can be used by a client application 118 (e.g., with an authentication credential) to access the functionality of the primary computing system 104, which may include information relating to account functionality. The primary profile 124 may identify one or more accounts associated with the user. The identifiers or authentication credentials of the primary profiles 124 can include a username, a password, an e-mail address, a phone number, a personal identification number (PIN), a secret code-word, or device identifiers for use in a two-factor authentication technique, among others.

A primary profile 124 may be created or updated by the primary computing system 104 in response to a primary profile 124 creation request transmitted by a user device 103. The user profile creation request can include any of the primary profile 124 information described herein. The primary profiles 124 (or the identity elements 126 thereof) can include information about an account (e.g., a financial account) maintained by an entity associated with the primary computing system 104. The information can include, for example, account balances, transaction histories, or brokerage trading information, among other account data. Additionally, various identity elements 126 of a primary profile 124 can include a list or table of secondary account (e.g., secondary profiles 108, etc.) identifiers associated with the user and maintained or stored at third-party computing systems. For example, various identity elements 126 stored as part of or in association with the secondary profiles 108 can include authentication credentials (e.g., username, password, email, PIN, etc.) to access the secondary profile 108 at the secondary computing system 102.

Additionally, the primary profile 124 or the secondary profile 108 can be updated with additional information using the client application 118. For example, the client application 118 can transmit information to store in the primary profile 124 (e.g., one or more datasets that the primary computing system 104 can store as one or more identity elements 126) in a request to update the primary profile 124. The primary computing system 104 may request an authentication credential (e.g., using techniques similar to those described herein, including biometric data, etc.), and can update the primary profile 124 with the information in the request upon determining that the authentication credential is legitimate. For example, the primary computing system 104 can verify that the authentication credential is valid prior to updating the primary profile 124 with corresponding identity elements 126.

Information stored at the primary systems 102 can be accessed, for example, by the user devices 103 using a communication application programming interface (API) 114. The primary computing system 104 can maintain and provide the communications API 114. The communications API 114 can be any type of API, such as a web-based API corresponding to a particular network address uniform resource identifier (URI), or uniform resource locator (URL), among others. The communications API 114 can be accessed, for example, by one or more of the user devices 103 or the user device 103, via the network 101. In some implementations, other secondary computing systems 102 can communicate with a primary computing system 104 via the communication API 114. The communications API 114 can be a client-based API, a server API (SAPI), or an Internet Server API (ISAPI).

Various protocols may be utilized to access the communications API 114, including a representational state transfer (REST) API, a simple object access protocol (SOAP) API, a Common Gateway Interface (CGI) API, or extensions thereof. The communications API may be implemented in part using a network transfer protocol, such as the hypertext transfer protocol (HTTP), the secure hypertext transfer protocol (HTTPS), the file transfer protocol (FTP), the secure file transfer protocol (FTPS), each of which may be associated with a respective URI or URL. The communications API 114 may be exposed to the user devices 103, which can execute one or more API calls to perform the various operations described herein. In an embodiment, the user devices 103 includes an API that is similar to the communications API 114, which the user device 103 can use communicate with the user devices 103 to perform the various operations described herein.

The secondary computing system 102 can include at least one storage 106, which may store one or more secondary profiles 108, each of which can correspond to a respective user. The secondary profiles 108 may be similar to the primary profiles 124, but including information relating to the secondary computing system 102 rather than the primary computing system 104. The secondary profiles 108 can store corresponding additional identity elements 126, which can include information about the users associated with the respective secondary profile 108. The user devices 103 can access the respective secondary computing system 102 using the secondary profile 108 of the respective secondary computing system 102, and create, modify, or delete one or more identity elements 126 associated with the user's secondary profile 108. In an embodiment, the secondary profiles 108 can include identity elements 126 relating to the respective user's activities at or related to the secondary computing system 102.

The primary computing system 104 can store and execute an artificial intelligence agent 130. The artificial intelligence agent 130 can include one or more trained machine-learning models that are executed by the primary computing system 104 to carry out any of the functionality described herein. For example, the artificial intelligence agent 130 can include trained regression, pattern recognition, and/or classification models that can identify and/or determine relationships between different users based on information in the primary profiles 124 of the users. The machine-learning models of the artificial intelligence agent 130 can be trained by the primary computing system 104 by performing a training process over a set of training data. The artificial intelligence model 130 can be trained to receive primary profiles 124, secondary profiles 108, identity elements 126, or combinations thereof as input, and to generate transitional elements corresponding to the identity elements 126 in the digital identity profiles (e.g., the primary profiles 124 or the secondary profiles 108) as output. Further details of an example process to train the artificial intelligence agent 130 are described in connection with FIG. 3.

The artificial intelligence agent 130 can include any type of machine-learning model, and may be executed on the primary profiles 124, the secondary profiles 108, or the identity elements 126, to generate transitional elements. The transitional elements can identify various aspects or characteristics of the identity elements 126 that indicate a potential issue (e.g., a network security issue, a potential future issue relating to finance or computer security, etc.) The transitional elements may identify one or more physical or digital assets, services, or other types of electronic activities that are responsible for the actual or potential issue. Some examples of machine learning models can include neural networks (e.g., a deep neural network (DNN), a convolutional neural network (CNN), a recurrent neural network (RNN) such as a long short-term memory (LSTM) model, combinations thereof, etc.), trained regression models (e.g., linear regression, sparse vector machine (SVM) models, logistic regression, polynomial regression, ridge regression, Lasso regression, Bayesian linear regression, etc.), or other types of classifiers (e.g., naïve Bayes, decision trees, k-nearest neighbors (kNN), extreme gradient boost (XGBoost) models, etc.). The artificial intelligence agent 130 can further include unsupervised machine-learning models. The aforementioned machine-learning models may also be utilized for any type of machine-learning or artificial intelligence performed task described herein.

The artificial intelligence agent 130 can be trained using any suitable machine-learning technique. For example, the artificial intelligence agent 130 can be trained using supervised learning techniques, unsupervised learning techniques, semi-supervised learning techniques, or combinations thereof. In an embodiment, the primary computing system 104 can train the artificial intelligence agent 130 using sets of training data, which may be generated using the techniques described herein. Further details of a process for training the artificial intelligence agent 130 is described in connection with FIG. 3.

Figure 3:
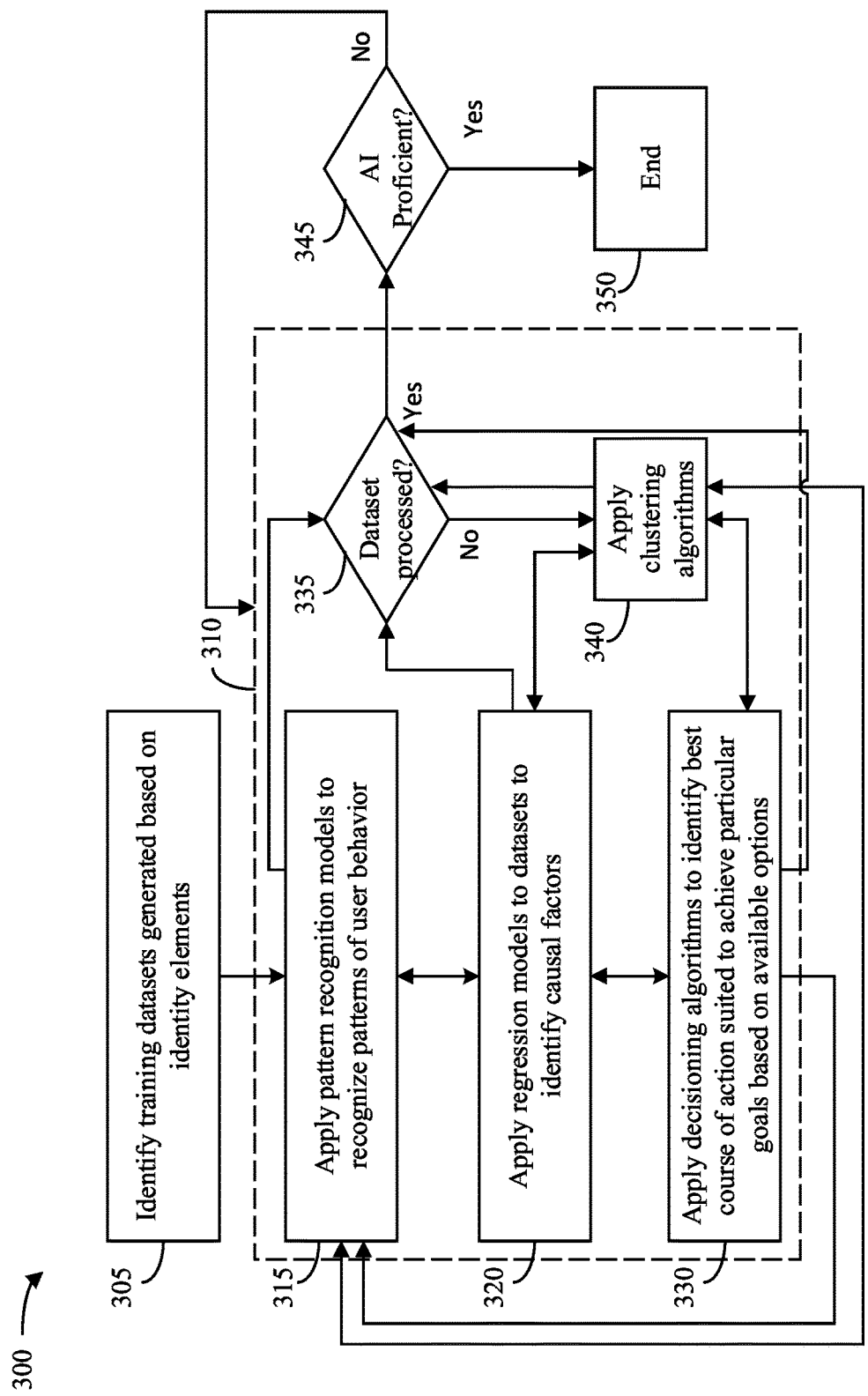
FIG. 3 is a block diagram of an example system for generating security access tokens, in accordance with one or more example implementations.

Referring to FIG. 3, illustrated is a process 300 of an example approach for applying various models to generated training sets for training an artificial intelligence agent (e.g., the artificial intelligence agent 130) to reach a certain proficiency level (e.g., accuracy threshold, etc.), according to potential embodiments. Process 300 may be implemented by the primary computing system 104, or any other computing device described herein. Input of which models to use, or of the modified models to be used, to generate the datasets also may be received via a network (e.g., the network 101) from one or more user devices (e.g., the user devices 103). At 305, the primary computing system may identify training datasets that are generated based on various identity elements (e.g., the identity elements 126) using the techniques described in connection with FIG. 4. In some implementations, the training datasets are created by sorting, categorizing, extracting, and/or manipulating identity elements 126 from the primary profiles 124, the secondary profiles 108, or from other electronic activity detected or received via the network.

After step 305, process 300 proceeds to 310, where the primary computing system may apply machine-learning techniques to train the artificial intelligence agent. The machine-learning techniques may be executed by one or more processors of the primary computing system and may be updated via input from one or more user devices, such as an administrator device that manages the primary computing system or coordinates its operations in some capacity. The algorithms may encompass a variety of machine-learning techniques that are executed by the primary computing system to train one or more trainable parameters of the machine-learning models described herein. For example, the artificial intelligence agent can be trained utilizing various input data, and may include information extracted from one or more digital identity profiles (e.g., the primary profiles 124, the secondary profiles 108), including the identity elements (e.g., the identity elements 126) thereof. The training data can be generated or can otherwise include data from primary profiles of users having secure or unsecure attributes or characteristics, including users that are known to be implicated in network security issues and users that are not known to be implicated in network security issues.

At 315, in an embodiment, the primary computing system may apply pattern recognition algorithms to recognize patterns of user behavior (e.g., based on behaviors or online activities identified in the identity elements 126 of the primary profiles 124 or the secondary profiles 108). Regression algorithms may be applied by the primary computing system, for example, to identify causal factors for one or more identity elements or corresponding metadata in the primary profiles for one or more users (step 320). For example, at 320, regression algorithms may be employed to train the artificial intelligence agent with one or more trainable parameters that indicate whether input data of primary profiles should result in the generation of one or more transitional elements (e.g., which may include identifications of identity elements that correspond to undesired electronic activity, network security issues, financial issues, or other types of issues). Some examples of regression techniques that may be used by the artificial intelligence agent include linear regression models, logistic regression models, SVM techniques, Least Absolute Selection Shrinkage Operator (LASSO) regression models, polynomial regression models, and other regression tree models.

At 330, the primary computing system may apply decisioning algorithms to identify a best course of action suited to achieve a particular goal (e.g., improving network security, reducing publicly available information in authentication credentials, etc.) based on one or more available options. The artificial intelligence agent may be instructed (e.g., via user input or via a received request) to perform one or more tasks, including analyzing one or more primary profiles, secondary profiles, or identity elements stored therein, and generate transitional elements corresponding to the identity elements in the profiles.

At 340, if the artificial intelligence agent cannot determine whether to generate transitional elements corresponding to one or more identity elements in the profiles (e.g., a confidence score generated by the artificial intelligence agent is less than a predetermined threshold) (step 335), the primary computing system may apply clustering algorithms to employ additional machine-learning techniques to classify the identity elements into a nearest related cluster in a set of identity elements. The number of clusters may be communicated to the primary computing system from an administrative computing device via the network to limit or expand the training of the artificial intelligence agent, or may be variable depending on the data acquired from the historical online sessions of the various users corresponding to the primary profiles. In some embodiments, the number of clusters can be predetermined so as to fit the tasks from the online sessions and user activity of customers into a preferred number of clusters. In various embodiments, the cubic clustering criterion (CCC) statistic may be calculated (from SAS procedure FASCLUS) to determine the maximum number of clusters to allow for training the artificial intelligence agent.

In some implementations, identity elements of primary profiles can be categorized using a k-means clustering algorithm that is unsupervised, with no dependent variable associated therewith. Alternatively or additionally, other approaches can be used to detect a sequence or pattern of electronic activities implicated or identified in the identity elements. For example, LSTM recurrent neural networks, gradient boosted trees, logistic regression, hidden and basic Markov models, and frequent pattern growth algorithms may be utilized in classifying patterns and decisions while training the artificial intelligence agent.

In some embodiments, clusters may be developed using, for example, Python, SAS, R, Spark and/or $H_2O$. In certain versions, k-means clustering may be developed using the SAS FASTCLUS procedure, which performs a disjoint cluster analysis on the basis of distances computed from one or more quantitative variables. The observations (e.g., the identity elements) may be divided into clusters such that every observation belongs to one and only one cluster. The clusters do not form a tree structure. The FASTCLUS procedure uses Euclidean distances, so the cluster centers are based on least-squares estimation. This kind of clustering method is often called a k-means model. The clustering aims to partition n observations into k clusters in which each observation belongs to the cluster with the nearest mean. The final cluster centers are the means of the observations assigned to each cluster when the algorithm is run to complete convergence. Each iteration reduces the least-squares criterion until convergence is achieved.

For example, given a set of observations $(x_1, x_2, \ldots, x_n)$, where each observation is a d-dimensional real vector, k-means clustering aims to partition the n observations into $k(\leq n)$ sets $S=\{S_1, S_2, \ldots, S_k\}$ so as to minimize the within-cluster sum of squares ("WCSS") (e.g., variance). Formally, the objective is to find:

$$\operatorname{argmin} \sum_{i=1}^{k} \sum_{x \in S_i} \|x - \mu_i\|^2 \qquad \text{Eq. 1}$$

where $\mu_i$ is the mean of points in $S_i$.

While the primary computing system executes the machine-learning techniques, one technique may be applied (such as at 315) before a different type of machine-learning technique is carried out (such as at 320). Instead of proceeding to 330, however, it may be needed to apply the same machine-learning technique used before (such as repeating 315) to make a new decision or after discovering a new situation of user activity or additional identity elements generated by the primary computing system (which is represented by the double arrows between different steps in process 300). For example, process 300 may continue to step 335 to check whether a dataset is classified after 315, 320, 330, or 340. In some embodiments, after step 330 is executed, process 300 may continue to 315, 320, or 340, for further training instead of continuing to step 335. In other embodiments, 340 is executed before checking whether the dataset is classified at 335 (e.g., 315 continues to 340 and/or 320 continues to 340). Additionally, after clustering algorithms are applied at 340, process 300 may continue to 315, 320, 330, or immediately recheck whether the dataset is process (e.g., whether transitional elements have been generated for qualifying identity elements) by proceeding to 335, in some examples. This multidirectional flow in process 300 may occur when more pattern recognition algorithms or other machine-learning techniques are utilized. In various embodiments, the primary computing system may determine how to proceed throughout process 300 at least in part based on user inputs from an administrative computing system.

At 345, the primary computing system may determine whether the artificial intelligence agent has achieved a sufficient proficiency level. The proficiency level may be determined by comparing an accuracy of the artificial intelligence model satisfies one or more predetermined thresholds. The accuracy of the artificial intelligence agent can be tested using a set of test data, which can be a set of data similar to the training data in that it includes ground truth information, but was not used during the training process. If, at 345, it is determined that the artificial intelligence agent is not sufficiently proficient, process 300 may continue to 310 to further train the machine-learning models of the artificial intelligence agent using additional training datasets. On the other hand, if it is determined that the artificial intelligence agent has reached a desired proficiency level, process 300 may end at 350, representing the end of the training process.

Figure 4:
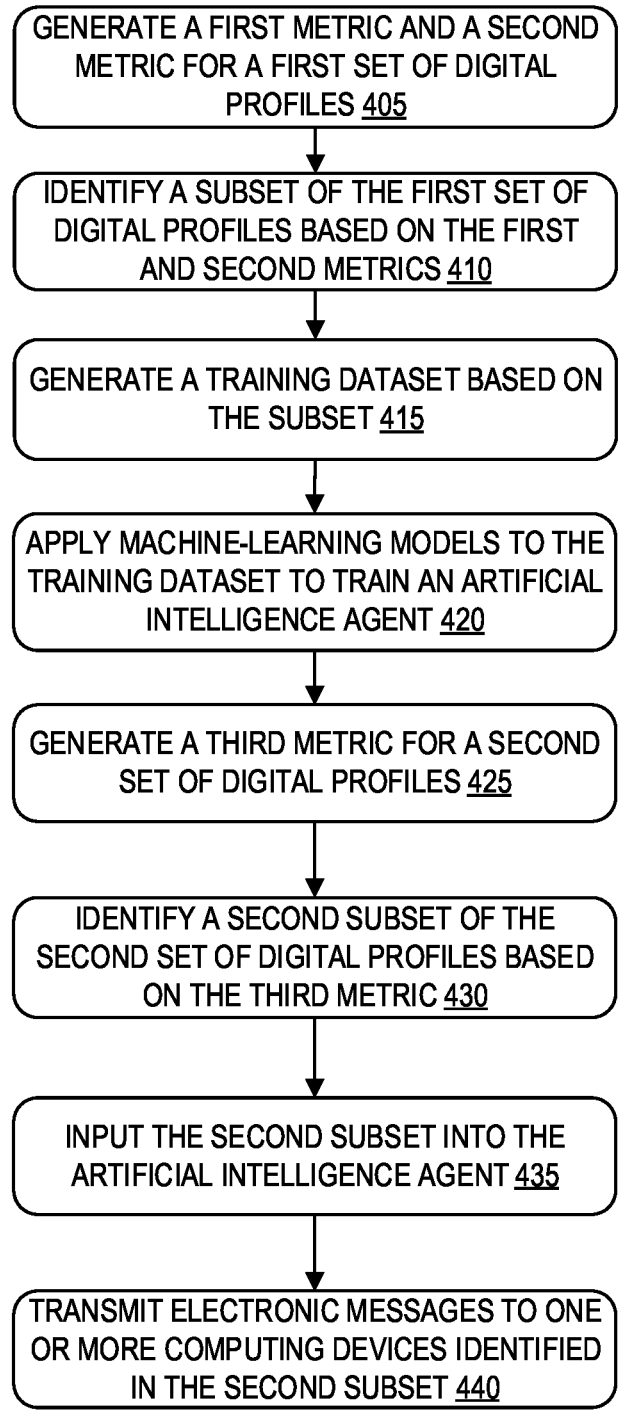
FIG. 4 is a flow diagram of an example method for executing machine-learning models for real-time and secure analysis of digital metrics, in accordance with one or more example implementations.

Referring to FIG. 4, illustrated is a flow diagram of an example method 400 for executing machine-learning models for real-time and secure analysis of digital metrics, in accordance with one or more example implementations. The method 400 can be a computer-implemented method. The method 400 may be implemented, for example, using any of the computing systems described herein, such as the primary computing system 104, the secondary computing system 102, the user device 103, or the computing system 600 described in connection with FIG. 6. In some implementations, additional, fewer, or different operations may be performed. It will be appreciated that the order or flow of operations indicated by the flow diagrams and arrows with respect to the methods described herein is not meant to be limiting. For example, in one implementation, two or more of the operations of method 400 may be performed simultaneously, or one or more operations may be performed as an alternative to another operation.

At step 405, the method 400 can include generating, for each profile in a first set of digital identity profiles (e.g., one or more primary profiles 124, secondary profiles 108, or combinations thereof, etc.), a first metric corresponding to a first time period and a second metric corresponding to a second time period after the first time period. For example, the metric can indicate one or more electronic activities of interest (e.g., network security-related activities, use of authentication credentials, spending habits, location information, frequency of information sharing, frequency of social media posting, or any other metric of an electronic activity that may be stored as part of a primary profile 124 or a secondary profile 108). Generating the metric(s) can include iterating through each identity element of interest (e.g., identifying or corresponding to an electronic or offline activity related to network security, financial security, online activity, spending habits, traveling habits, social media activity, etc.) of each profile corresponding to a set of users.

The first metric can correspond to a particular metric at a first time period. As such, the first metric can be generated for identity elements having metadata (e.g., a timestamp) indicating that an activity of interest was performed within the first time period. The first time period may be predetermined, or may be a period of time relative to the current time (e.g., one month ago, 3 months ago, 6 months ago, 1 year ago, 3 years ago, 5 years ago, 10 years ago, etc.). The first metric may be a numerical measure of a particular outcome, status, or issue that may be experienced by the user as indicated in the identity elements (e.g., rate of network security issues, credit score, total debt, lack of up-to-date payments, password resets, indications of data breaches or data leaks, etc.). The first time period may have a predetermined duration (e.g., over the course of a month, 3 months, 6 months, 1 year, 3 years, 5 years, 10 years, etc.). The second metric can be determined using similar techniques, but for a second time period that occurs after the first time period. The difference between the first metric and the second metric can indicate changes in online activity of the user that results in different objective measures of potentials outcomes of interest (e.g., rate of network security issues, credit score, total debt, lack of up-to-date payments, password resets, indications of data breaches or data leaks, etc.).

In an embodiment, the profiles in the first set of profiles can be retrieved from a storage (e.g., the storage 122) of the primary computing system. Additionally or alternatively, the primary computing system can retrieve one or more identity elements corresponding to the first time period, from a second computing system (e.g., the secondary computing system 102) storing one or more of the first set of profiles (e.g., as part of the secondary profiles 108). In an embodiment, the second metric can be generated from a second set of identity elements extracted from the first set of profiles. The second set of identity elements can include metadata that corresponds to the second time period. To retrieve the identity elements from the second computing system, the primary computing system can transmit an API call (e.g., via the communications API 114) to the second computing system.

At step 410, the method 400 can include identifying a first subset of the first set of digital identity profiles for which (i) the first metric falls below a threshold and (ii) the second metric is at least as great as the threshold. As described herein, the first metric can be generated from identity elements corresponding to the first time period, and the second metric can be generated from identity elements corresponding to the second time period. The difference in the first and second metrics, therefore, can indicate that characteristics of the user correspond to desirable or undesirable network security-related behavior. For example, the metric can correspond to a number of desired electronic activities that are known to correspond to a predetermined outcome over particular time periods (e.g., reducing network security incidents, reducing data leaks or cyberattacks, etc.). The primary computing system can identify which of the profiles are associated with a first metric that is below a predetermined threshold during the first time period, but also associated with a second metric that is greater than or equal to the predetermined threshold at the second time period. This indicates that the corresponding profiles may include information that resulted in a desired improvement (e.g., in network security, spending habits, etc.). Information from these identity elements and profiles can be utilized to train an artificial intelligence agent (e.g., the artificial intelligence agent 130) using the techniques described herein.

At step 415, the method 400 can include generating a training dataset based on the identified subset of the identity elements. The generated training dataset can include one or more data structures that are configured to correspond to an input layer of one or more machine-learning models of an artificial intelligence agent (e.g., the artificial intelligence agent 130) of the primary computing system. The data structures can be any suitable data structure, including one or more vectors, matrices, tensors, or other types of data structures that can be provided as input to the artificial intelligence agent. The training dataset can be generated to include the subset of identity profiles (e.g., the primary profiles 124, the secondary profiles 108, or combinations thereof, etc.) that correspond to the conditions of step 410 (e.g., a first metric below a threshold and a second metric that is equal to or greater than the threshold).

At step 420, the method 400 can include applying one or more machine learning models to the training dataset to train an artificial intelligence agent (e.g., the artificial intelligence agent 130). The artificial intelligence agent is configured to receive one or more profiles as input and generate transitional elements as output. The transitional elements can correspond to the identity elements in the profiles received as input. The transitional elements can be elements included in the digital profile that may, for example, reduce the risk of a data breach or other undesirable actions or outcomes. The trained artificial intelligence agent can be trained to detect similar transitional elements across a large cohort of digital profiles. In effect, the transitional elements can be identity elements, characteristics of a user, or electronic or offline activities of the user, which can be changed to improve the metric. As the training data includes profiles of users that improved their metrics over time, the artificial intelligence agent can be executed, for example, to identify the traits that changed (or could be changed) to improve the metric. To do so, the identity elements of the profiles in the training dataset can be provided as input to the one or more machine-learning models. The machine-learning models of the artificial intelligence agent can identify the identity elements that resulted in the improved metric (e.g., changes over time, various electronic activities, habits, or other types of relevant information in the profiles, etc.). The artificial intelligence agent can be trained by executing the process 300 described in connection with FIG. 3.

At step 425, the method 400 can include generating a third metric for each digital identity profile in a second set of digital profiles. After the artificial intelligence agent has been trained, the primary computing system can identify a second set of profiles for which to calculate a third metric, which may be similar to the first metric and the second metric, and may be determined using similar techniques. For example, the third metric can indicate one or more electronic activities of interest (e.g., network security-related activities, use of authentication credentials, spending habits, location information, frequency of information sharing, frequency of social media posting, or any other metric of an electronic activity that may be stored as part of a primary profile 124 or a secondary profile 108). Generating the metric(s) can include iterating through each identity element of interest (e.g., identifying or corresponding to an electronic or offline activity related to network security, financial security, online activity, spending habits, traveling habits, social media activity, etc.) of each profile in the second set.

In an embodiment, the profiles in the second set of profiles can be retrieved from a storage (e.g., the storage 122) of the primary computing system. Additionally or alternatively, the primary computing system can retrieve one or more of the second set of profiles from a second computing system (e.g., the secondary computing system 102). In an embodiment, the second metric can be generated from a second set of identity elements extracted from the second set of profiles. To retrieve the identity elements from the second computing system, the primary computing system can transmit an API call (e.g., via the communications API 114) to the second computing system.

At step 430, the method 400 can include identifying a second subset of the second set of profiles for which the third metric falls below the threshold. In order to identify the users that can benefit from the trained artificial intelligence agent, the primary computing system can identify a subset of the second set of profiles that are associated with a metric that falls below a threshold. To do so, the primary computing system can iterate through each of profiles in the second set, and compare the third metric calculated for that profile to the predetermined threshold. If the third metric is below the threshold, the profile can be included in the subset. If the third metric for the profile is not below the threshold, the primary computing system will not include the profile in the subset.

At step 435, the method 400 can include inputting the subset of the second set of digital profiles to the artificial intelligence agent to generate a set of transitional elements for each profile in the subset. As described herein, the artificial intelligence agent can include one or more machine-learning models, which may be utilized to generate transitional elements. Each of the profiles in the subset of the second set of digital profiles identified in step 430 can be provided as an input (e.g., via an input layer, as an argument for the model, as a parameter, etc.). In an embodiment, one or more of the identity elements in each profile can be provided as input to the artificial intelligence model. The primary computing system can execute the machine-learning models of the artificial intelligence agent, performing the calculations of the model and propagating intermediate values through the hidden layers (e.g., if a neural network or other type of layer-based model) or through the trainable parameters of the model until an output is generated. The output can identify one or more transitional elements, or actions or electronic activities that can be performed to improve the metric over time for the identified profile. Upon generation, the transitional elements can be stored in association with the respective digital profile that was provided as input to the artificial intelligence agent. In effect, the transitional elements can be identity elements, characteristics of a user, or electronic or offline activities of the user, which can be changed to improve the metric over time.

At step 440, the method 400 can include transmitting one or more electronic messages to one or more computing devices (e.g., the user devices 103) identified in the subset of the second set of digital profiles identified in step 430. The electronic messages can correspond to the set of transitional elements. For example, the electronic messages can identify (e.g., via text, graphics, video, or other types of content), one or more electronic activities or other actions that are identified in the transitional elements that can improve the metric for that user. The messages may be any type of electronic message, including a text message, an email, a push notification, a pop-up, a banner in a client application (e.g., the client application 118), an operating system message, a warning message, an alert, or any other type of message. In an embodiment, one or more electronic messages can include one or more selectable electronic links (e.g., hyperlinks, buttons, graphics, other interactive user interface elements, etc.) for activities corresponding to a predetermined outcome, which may relate to the transitional elements.

For example, the predetermined outcome can correspond to one or more electronic activities that improve network security, including regularly changing a password, improving password characteristics (e.g., more characters, including various letters, numbers, and symbols, etc.), changing browsing or network activity or behavior (e.g., avoiding websites that are insecure), changing spending habits or not providing payment data (e.g., card numbers, account numbers, etc.) to insecure merchants, or other types of activities. The primary computing system can determine that one or more selectable links in the one or more electronic messages have been activated by a user, and can add an indication that one or more selectable links have been activated to the profile of that user. For example, an interaction with the link can cause the user device showing the link to transmit a response to the primary computing system identifying the link with which the user interacted. Upon receiving the response, the primary computing system can generate an additional follow-up message to the user, indicating that the link was activated. In response, the primary computing system can transmit a second set of electronic messages to the computing device including additional information relating to the user selections.

For example, the messages may include rewards or other types of incentivizes to encourage lower-risk or lower-maintenance network activity, and to encourage certain electronic activities that result in better network and financial security. To improve financial electronic activity, the electronic messages can include details relating to past travel or purchase history (e.g., spending habits, how that impacts budgeting, etc.). This can provide better insight into the user's financial habits.

The primary computing system can generate and transmit electronic messages that provide recommendations for financial coaching to improve financial security and spending. The second set of messages can take the form of recommendations generated based on the identity elements in the user's profile, and based on the transitional elements. Additionally or alternatively, the user may select to view various network activity or other identity elements for which the transitional elements were generated (e.g., those that contribute to the lower-than-desired metric). Other security features may also be presented in the second set of electronic messages, for example, a prompt to change a password, provide more up-to-date identity elements in the users profile, correct incorrect information, or to view the calculated metric for the user's profile, among other functionality.

Figure 5:
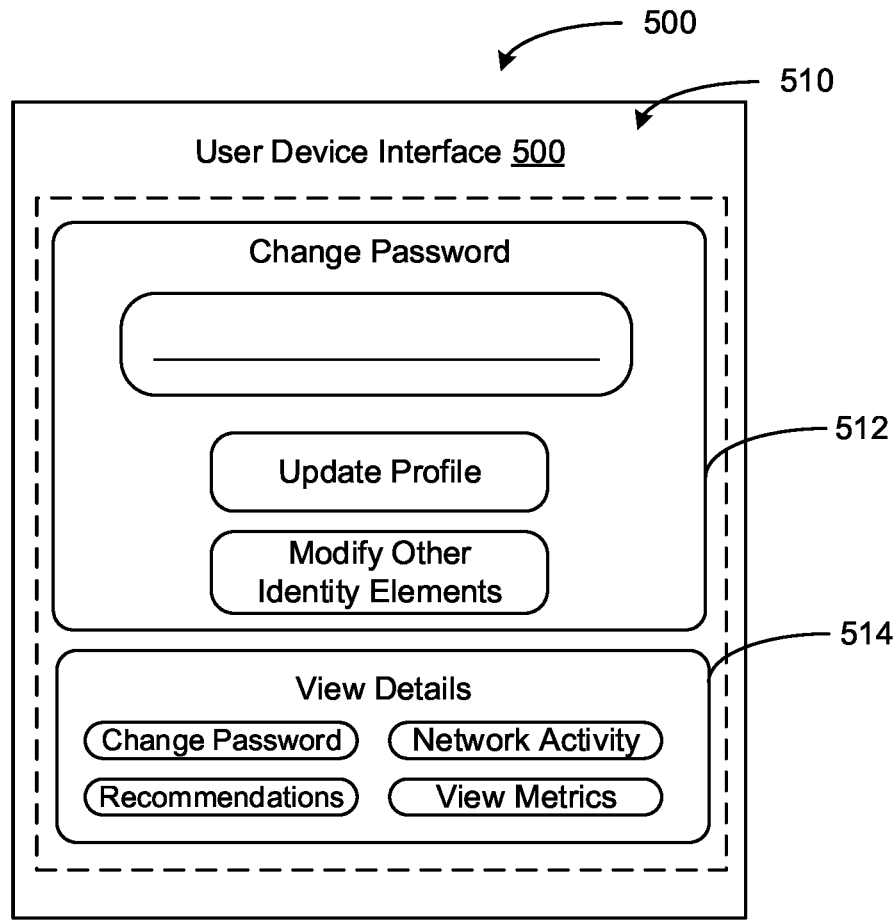
FIG. 5 is a diagram of an example user interface that may be presented on one or more user devices when performing the techniques described herein, in accordance with one or more example implementations.

Referring to FIG. 5, illustrated is an example user interface 500 includes a first interface feature 510, which may be presented by a client application (e.g., the client application 118) executing on a user device (e.g., the user device 103). The one or more portions of the user interface 500 may be transmitted by the primary computing system (e.g., the primary computing system 104), for example, as part of one or more electronic messages. As shown in FIG. 5, the first interface feature 510 includes one or more message shown as a first message 512 and a second message 514. It should be understood that the first interface feature 510 may include more or fewer electronic messages than as shown in FIG. 5, including any of the electronic messages described herein. In some implementations, the first interface feature 510 is displayed when the user device 103 receives one or more electronic messages from the primary computing system 104.

In some implementations, each of the electronic messages (e.g., the first messages 512, the second 514, etc.) depict various interactive user interface elements, including interactive hyperlinks and field with which the user may provide one or more identity elements. As shown in the electronic message 512, the user is prompted to enter in a new password for their profile (e.g., a primary profile 124, a secondary profile 108, etc.). The first message 512 may be provided by the primary computing system 104 in response to an interaction with a corresponding interactive element displayed in the second message 514. The second message 514 depicts a set of selectable links (e.g., hyperlinks, buttons, interactive graphics, etc.) shown as "View Details," from which the user can select among "Change Password," "Network Activity," "Recommendations," or "View Metrics." However, it should be understood that the list of these options are not exhaustive, and that the second message 514 may include any type of interactive link or message relating to the profiles of the user, the transitional elements generated by the user, or the identity elements in the profiles of the user, among others.

Figure 6:
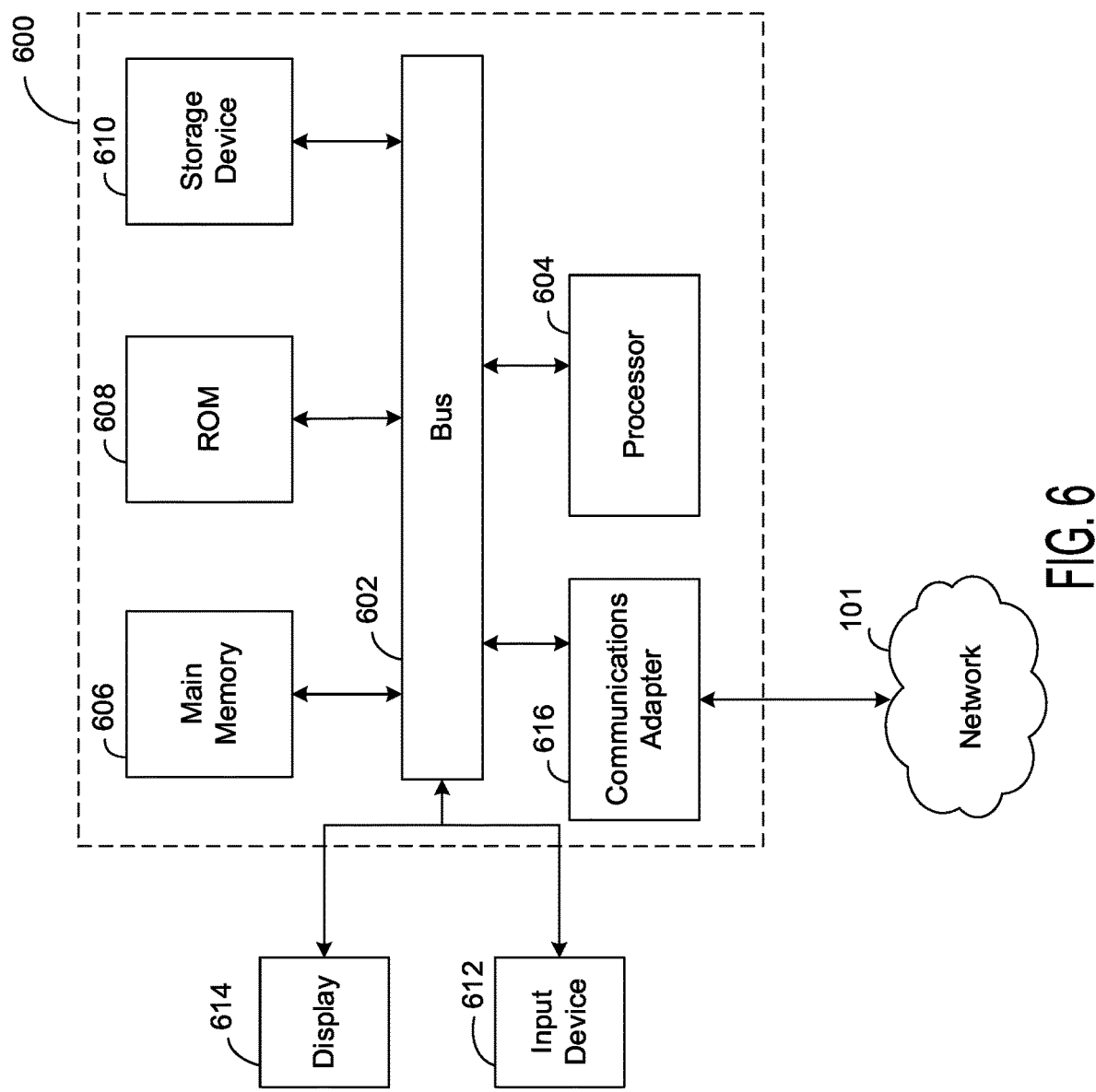
FIG. 6 is a component diagram of an example computing system suitable for use in the various arrangements described herein, in accordance with one or more example implementations.

FIG. 6 is a component diagram of an example computing system suitable for use in the various implementations described herein, according to an example implementation. For example, the computing system 600 may implement an example trusted computing system 102, user device 103, or primary computing system 104 of FIG. 1, or various other example systems and devices described in the present disclosure.

The computing system 600 includes a bus 602 or other communication component for communicating information and a processor 604 coupled to the bus 602 for processing information. The computing system 600 also includes main memory 606, such as a RAM or other dynamic storage device, coupled to the bus 602 for storing information, and instructions to be executed by the processor 604. Main memory 606 can also be used for storing position information, temporary variables, or other intermediate information during execution of instructions by the processor 604. The computing system 600 may further include a read only memory (ROM) 608 or other static storage device coupled to the bus 602 for storing static information and instructions for the processor 604. A storage device 610, such as a solid-state device, magnetic disk, or optical disk, is coupled to the bus 602 for persistently storing information and instructions.

The computing system 600 may be coupled via the bus 602 to a display 614, such as a liquid crystal display, or active matrix display, for displaying information to a user. An input device 612, such as a keyboard including alphanumeric and other keys, may be coupled to the bus 602 for communicating information, and command selections to the processor 604. In another implementation, the input device 612 has a touch screen display. The input device 612 can include any type of biometric sensor, or a cursor control, such as a mouse, a trackball, or cursor direction keys, for communicating direction information and command selections to the processor 604 and for controlling cursor movement on the display 614.

In some implementations, the computing system 600 may include a communications adapter 616, such as a networking adapter. Communications adapter 616 may be coupled to bus 602 and may be configured to enable communications with a computing or communications network 101 and/or other computing systems. In various illustrative implementations, any type of networking configuration may be achieved using communications adapter 616, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 600 in response to the processor 604 executing an implementation of instructions contained in main memory 606. Such instructions can be read into main memory 606 from another computer-readable medium, such as the storage device 610. Execution of the implementation of instructions contained in main memory 606 causes the computing system 600 to perform the illustrative processes described herein. One or more processors in a multi-processing implementation may also be employed to execute the instructions contained in main memory 606. In alternative implementations, hard-wired circuitry may be used in place of or in combination with software instructions to implement illustrative implementations. Thus, implementations are not limited to any specific combination of hardware circuitry and software.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more general-purpose processors, ASICs, FPGAs, digital signal processors (DSPs), or other suitable electronic data processing components structured to execute instructions provided by memory. The one or more processors may take the form of a single core processor, multi-core processor (e.g., a dual core processor, triple core processor, and/or quad core processor), microprocessor, etc. In some implementations, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data, which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

What is claimed is:

1. A method, comprising:
    generating, by a computing system comprising one or more processors, for each digital identity profile in a first set of digital identity profiles, a first metric corresponding to a first time period, and a second metric corresponding to a second time period following the first time period;
    identifying, by the computing system, a first subset of the first set of digital identity profiles for which (i) the first metric falls below a threshold, and (ii) the second metric is at least as great as the threshold;
    generating, by the computing system, for each digital identity profile in the first subset of digital identity profiles, a training dataset based on a first set of digital identity elements and a second set of digital identity elements;
    applying, by the computing system, one or more machine learning models to the training dataset to train an artificial intelligence (AI) agent that is configured to receive, as input, digital identity profiles and provide, as output, transitional elements corresponding to digital identity elements in the digital identity profiles received as input;
    generating, by the computing system, a third metric for each digital identity profile in a second set of digital identity profiles;
    identifying, by the computing system, a second subset of the second set of digital identity profiles for which the third metric falls below the threshold;
    inputting, by the computing system, the second subset of second set of digital identity profiles to the AI agent to generate, for each digital identity profile in the second set of digital identity profiles, a set of transitional elements; and
    transmitting, by the computing system, to one or more computing devices identified in the second subset of digital identity profiles, one or more electronic messages corresponding to the set of transitional elements.

2. The method of claim 1, wherein applying the one or more machine learning models comprises applying a pattern recognition model or a classification model to recognize normal or abnormal patterns of behavior.

3. The method of claim 1, wherein applying the one or more machine learning models comprises applying a regression model to identify causal factors for one or more identity elements or corresponding metadata in digital identity profiles.

4. The method of claim 1, wherein applying the one or more machine learning models comprises applying a decisioning model to identify actions suited to achieving particular goals based on available options.

5. The method of claim 1, further comprising adding, by the computing system, the set of transitional elements to corresponding digital identity profiles in the second subset of digital identity profiles.

6. The method of claim 1, wherein the computing system is a first computing system, the method further comprising retrieving, by the first computing system, from a second computing system with the first set of digital identity profiles, the first set of digital identity elements corresponding to the first time period, the first set of metadata corresponding to the first set of digital identity elements, the second set of digital identity elements corresponding to the second time period, and the second set of metadata corresponding to the second set of digital identity elements.

7. The method of claim 6, wherein the retrieving comprises transmitting a first application programming interface (API) call to the second computing system.

8. The method of claim 1, wherein the computing system is a first computing system, the method further comprising retrieving, by the first computing system, the second set of digital identity profiles from a second computing system.

9. The method of claim 8, wherein the retrieving comprises transmitting an application programming interface (API) call to the second computing system.

10. The method of claim 1, wherein the first set of digital identity profiles and the second set of digital identity profiles are maintained by the computing system.

11. The method of claim 1, wherein a metric meeting or exceeding the threshold indicates electronic activities that correspond to a predetermined outcome.

12. The method of claim 1, wherein the one or more electronic messages comprise one or more selectable electronic links for activities corresponding to a predetermined outcome.

13. The method of claim 12, further comprising determining, by the computing system, that one or more selectable links in the one or more electronic messages have been activated.

14. The method of claim 13, further comprising adding, by the computing system, an indication that one or more selectable links have been activated.

15. The method of claim 13, further comprising transmitting a second set of one or more electronic messages based on activation of one or more selectable links.

16. A computing system comprising one or more hardware processors coupled to non-transitory memory, the computing system configured to:
generate, for each digital identity profile in a first set of digital identity profiles, a first metric corresponding to a first time period, and a second metric corresponding to a second time period following the first time period;
identify a first subset of the first set of digital identity profiles for which (i) the first metric falls below a threshold, and (ii) the second metric is at least as great as the threshold;
generate, for digital identity profiles in the first subset of digital identity profiles, a training dataset based on a first set of digital identity elements and a second set of digital identity elements;
apply one or more machine learning models to the training dataset to train an artificial intelligence (AI) agent that is configured to receive, as input, digital identity profiles and provide, as output, transitional elements corresponding to digital identity elements in the digital identity profiles received as input;
generate a third metric for each digital identity profile in a second set of digital identity profiles;
identify a second subset of the second set of digital identity profiles for which the third metric falls below the threshold;
input the second subset of second set of digital identity profiles to the AI agent to generate, for each digital identity profile in the second set of digital identity profiles, a set of transitional elements; and
transmit, to one or more computing devices identified in the second subset of digital identity profiles, one or more electronic messages corresponding to the set of transitional elements.

17. The computing system of claim 16, wherein applying the one or more machine learning models comprises applying at least one of:
a pattern recognition model or a classification model to recognize normal or abnormal patterns of behavior;
a regression model to identify causal factors for one or more identity elements or corresponding metadata in digital identity profiles; or
a decisioning model to identify actions suited to achieving particular goals based on available options.

18. The computing system of claim 16, the one or more processors further configured to add the set of transitional elements to corresponding digital identity profiles in the second subset of digital identity profiles.

19. The computing system of claim 16, wherein the one or more electronic messages comprise one or more selectable electronic links for activities corresponding to a predetermined outcome.

20. The computing system of claim 19, the one or more processors further configured to:
determine that one or more selectable links in the one or more electronic messages have been activated; and
transmit a second set of one or more electronic messages based on activation of one or more selectable links.

* * * * *